(12) United States Patent
Glessner et al.

(10) Patent No.: US 11,639,671 B2
(45) Date of Patent: May 2, 2023

(54) UNDUCTED FAN TURBINE ENGINE WITH A COWL DOOR

(71) Applicant: GENERAL ELECTRIC COMPANY, Schenectady, NY (US)

(72) Inventors: John Carl Glessner, Kings Mill, OH (US); Mark Edward Linz, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/368,214

(22) Filed: Jul. 6, 2021

(65) Prior Publication Data

US 2023/0010841 A1    Jan. 12, 2023
US 2023/0010841 A1    Jan. 12, 2023

(51) Int. Cl.
    *F01D 25/24*    (2006.01)

(52) U.S. Cl.
    CPC ........ *F01D 25/24* (2013.01); *F05D 2220/323* (2013.01); *F05D 2240/14* (2013.01)

(58) Field of Classification Search
    CPC . F01D 25/24; F05D 2220/323; F05D 2240/14
    See application file for complete search history.

(56) References Cited

U.S. PATENT DOCUMENTS

| | | |
|---|---|---|
| 3,417,946 A | 12/1968 | Hartley |
| 4,050,651 A | 9/1977 | Neal et al. |
| 4,447,022 A | 5/1984 | Lion |
| 5,096,142 A | 3/1992 | Rodriguez |
| 6,824,092 B1 | 11/2004 | Franklin, III et al. |
| 6,848,650 B2 | 2/2005 | Hoisignton et al. |
| 6,921,045 B2 | 7/2005 | Chang et al. |
| 7,900,868 B2 | 3/2011 | Sankrithi et al. |
| 8,708,274 B2 | 4/2014 | Lord |
| 8,720,818 B1 | 5/2014 | Teulou et al. |
| 8,876,465 B2 | 11/2014 | Stretton |
| 9,506,423 B2 | 11/2016 | Izquierdo et al. |
| 9,677,501 B2 | 6/2017 | Pierluissi et al. |
| 9,845,768 B2 | 12/2017 | Pesyna et al. |
| 9,951,721 B2 | 4/2018 | Kupratis et al. |
| 10,145,304 B2 | 12/2018 | Weiner |
| 10,514,002 B2 | 12/2019 | Moon et al. |
| 10,704,410 B2 * | 7/2020 | Zatorski ................ B64C 11/001 |
| 10,794,288 B2 | 10/2020 | Schwarz et al. |
| 2009/0065632 A1 | 3/2009 | Cazals |
| 2015/0300208 A1 * | 10/2015 | Beutin ...................... F02C 7/05 |
| | | 415/121.2 |
| 2017/0233060 A1 | 8/2017 | Glover et al. |

FOREIGN PATENT DOCUMENTS

WO    2016134433 A1    9/2016

* cited by examiner

*Primary Examiner* — Jacob M Amick
(74) *Attorney, Agent, or Firm* — McGarry Bair PC

(57) ABSTRACT

An unducted fan turbine engine comprising an engine core including a first airflow, and a nacelle circumscribing at least a portion of the engine core and having an exterior surface defining a second airflow. The nacelle further comprising an internal passage between the exterior surface and the engine core, the internal passage defining a third airflow. The unducted fan turbine engine further comprising a plurality of rotatable fan blades extending radially beyond the exterior surface of the nacelle, and a cowl door located in the nacelle.

20 Claims, 10 Drawing Sheets

UNDUCTED FAN TURBINE ENGINE WITH A COWL DOOR

TECHNICAL FIELD

The disclosure generally relates to a unducted fan turbine engine, and, more specifically to a cowl door for an unducted fan turbine engine.

BACKGROUND

Turbine engines are rotary engines that extract energy from a flow of working air passing serially through a compressor section, where the working air is compressed, a combustor section, where fuel is added to the working air and ignited, and a turbine section, where the combusted working air is expanded and work taken from the working air to drive the compressor section along with other systems, and provide thrust in an aircraft implementation. The compressor and turbine stages comprise axially arranged pairs of rotating blades and stationary vanes. The gas turbine engine can be arranged as an engine core comprising at least a compressor section, a combustor section, and a turbine section in axial flow arrangement and defining at least one rotating element or rotor and at least one stationary component or stator.

Turbine engines can come in different configurations, such as a turboprop engine, which is a turbine engine that drives an aircraft propeller, a turbofan engine, which is a turbine engine with a fan upstream of the engine core, with both the fan and the engine core being received within a nacelle, and a propfan turbine engine, which is also called an unducted fan turbine engine. The unducted fan includes aspects of both turboprop engine and the turbofan engine. For example, an unducted fan turbine engine can include a set of rotating blades, or propellers, on the exterior of the engine casing similar to a turboprop, without the rotating blade being constrained within the nacelle. The lack of a nacelle or other casing surrounding the rotating blades of the fan section, lead to the name of an "unducted" fan or propfan engine. A nacelle or other casing may still be used to enclose the engine core, just not the fan blades. Historically, unducted fan engines, while more fuel efficient at commercial aircraft cruise speeds, have had other characteristics, such as comparatively loud noise levels, which have prevented them from being widely adopted for commercial aircraft.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION OF THE EMBODIMENTS

Figure 1:
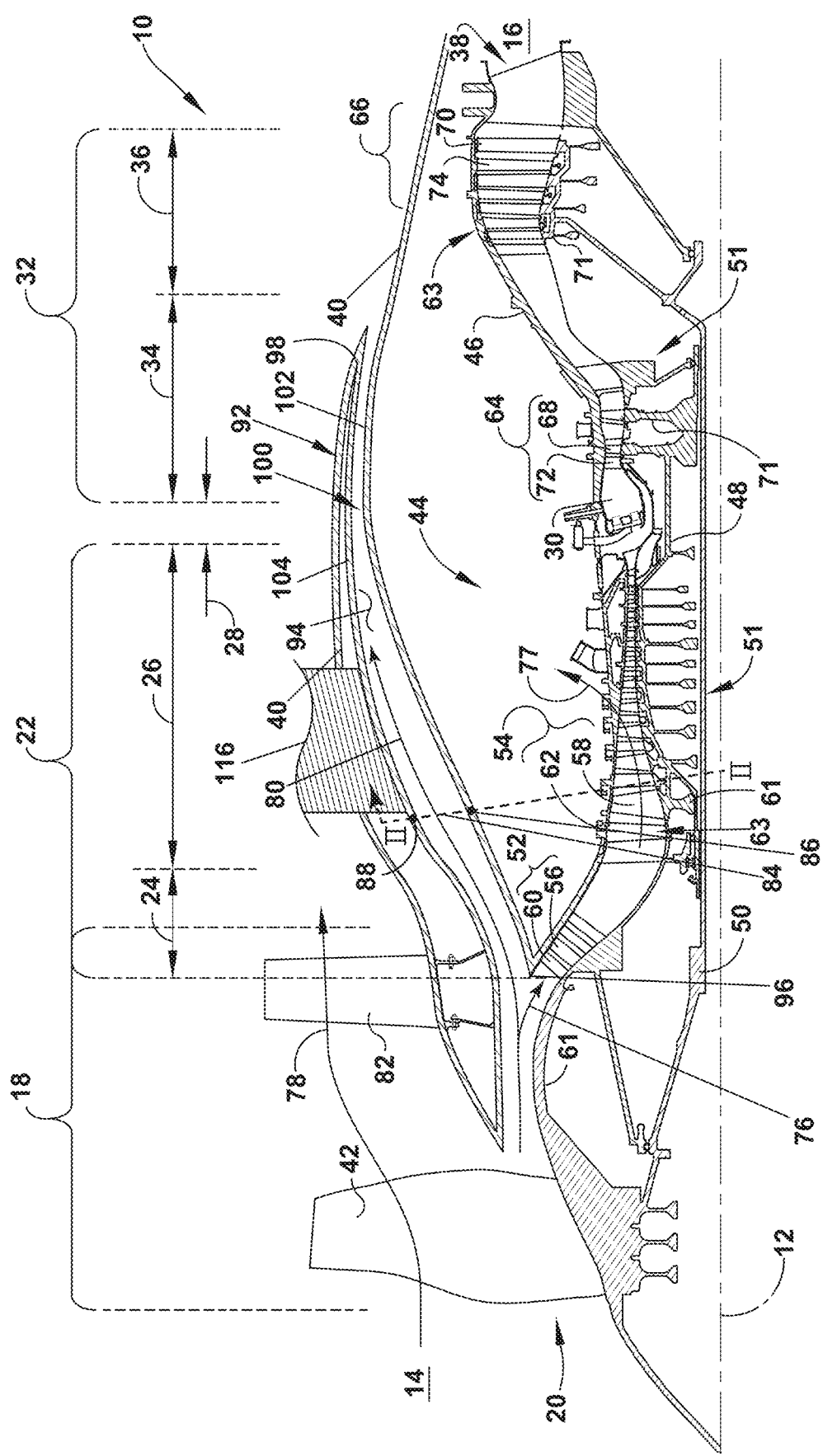
FIG. 1 is a schematic cross-sectional view of a unducted fan turbine engine for an aircraft and including a nacelle defining an internal passage and including a cowl, a third airflow within the internal passage, and an engine core.

The present disclosure relates to a set of cowl doors for a turbine engine, and more specifically to a set of cowl doors for an unducted fan turbine engine. The unducted fan turbine engine, as described herein, can be include by a fan, a set of vanes downstream the fan, and an engine core, with the fan and the set of vanes located along a portion of an exterior of a nacelle, which defines at least a portion of the exterior of the unducted fan turbine engine. The unducted fan turbine engine can further be defined by three main airflows; a first airflow, a second airflow, and a third airflow. The first airflow can be defined as an airflow that flows through an engine core, the second airflow can be defined as an airflow that flows through the fan, over the exterior of the nacelle, and the set of vanes, while the third airflow can be defined as an airflow that flows through at least a portion of the nacelle, specifically through an internal passage formed within the nacelle. The set of cowl doors can be included within the nacelle, specifically within a portion of the nacelle defining a portion of the third airflow. It is contemplated that the set of cowl doors can be coupled to an engine mount through a set of hinges such that the cowl doors can be moveable between a first or closed position, and a second or opened position.

The set of cowl doors of the unducted fan turbine engine, as described herein, can allow for selective access to at least a portion of the engine core without having to physically remove portions of the unducted fan turbine engine. For the purposes of illustration, one exemplary environment within which set of cowl doors can be utilized will be described in the form of unducted fan turbine engine. It will be appreciated, however, that the set of cowl doors, as described herein, however, can have general applicability to any turbine engine such as, but not limited to, a gas turbine engine, a turboprop, turboshaft, a turbofan engine having a power gearbox, or the unducted fan turbine engine in non-limiting examples. It will be understood, however, that aspects of the disclosure described herein are not so limited and can have general applicability within other turbine engines. For example, the disclosure can have applicability for a set of cowl doors in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto can vary. As used herein, a "set" can include any number of elements, including only one. "Integral monolithic body" or "monolithic body" as used herein means a single body that is a single, non-separable piece, or formed as a single unitary piece at manufacture, as opposed to being formed by combining separate elements into one during manufacture.

FIG. 1 is a schematic cross-sectional diagram of a turbine engine, specifically a unducted fan turbine engine 10 for an aircraft. The unducted fan turbine engine 10 has a generally longitudinally extending axis or engine centerline 12 extending from a forward 14 to an aft 16. The unducted fan turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The unducted fan turbine engine 10 as described herein is meant as a non-limiting example, and other architectures are possible, such as, but not limited to, the steam turbine engine, the supercritical carbon dioxide turbine engine, or any other suitable turbine engine.

An exterior surface, defined by a nacelle 40, of the unducted fan turbine engine 10 can extend from the forward 14 toward the aft of the unducted fan turbine engine 10 and cover at least a portion of the compressor section 22, the combustion section 28, the turbine section 32, and the exhaust section 38. The fan section 18 can be positioned at a forward 14 portion of the nacelle 40 and extend radially outward from the nacelle 40 of the unducted fan turbine engine 10, specifically, the fan section 18 can extend radially outward from a nacelle 40. The fan section 18 includes a set of fan blades 42, and a set of stationary fan vanes 82 downstream the set of fan blades 42, both disposed radially about the engine centerline 12. As a non-limiting example, the unducted fan turbine engine 10 can include a single set of rotating blades or propellers (e.g., the set of fan blades 42) disposed upstream of the set of stationary fan vanes 82. As such, the unducted fan turbine engine 10 can be further defined as a unducted single-fan turbine engine. The unducted fan turbine engine 10 can be further defined by the location of the fan section 18 with respect to the combustion section 28. As illustrated, the fan section 18 is in the front or forward the combustion section 28 such that the unducted fan turbine engine 10 is considered an unducted fan turbine engine 10 with a front or puller fan section 18. Alternatively, the fan section 18 can be downstream or aft the combustion section 28 such that the unducted fan turbine engine 10 is considered an unducted fan turbine engine 10 with a rear or pusher fan section 18.

The compressor section 22, the combustion section 28, and the turbine section 32 can be collectively referred to as an engine core 44, which generates combustion gases. The engine core 44 is surrounded by engine casing 46, which can be coupled with a portion of the nacelle 40 of the unducted fan turbine engine 10.

A HP shaft or spool 48 disposed coaxially about the engine centerline 12 of the unducted fan turbine engine 10 drivingly connects the HP turbine 34 to the HP compressor 26. A LP shaft or spool 50, which is disposed coaxially about the engine centerline 12 of the unducted fan turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which can collectively define a rotor 51.

The LP compressor 24 and the HP compressor 26 respectively include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to a disk 61, which is mounted to the corresponding one of the HP and LP spools 48, 50, with each stage having its own disk 61. The static compressor vanes 60, 62 for a stage of the compressor can be mounted to the engine casing 46 in a circumferential arrangement.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50, with each stage having a dedicated disk 71. The turbine vanes 72, 74 for a stage of the compressor can be mounted to the engine casing 46 in a circumferential arrangement.

Complementary to the rotor portion, the stationary portions of the unducted fan turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the unducted fan turbine engine 10.

The nacelle 40 can be operatively coupled to the unducted fan turbine engine 10 and cover at least a portion of the engine core 44, the engine casing 46, or the exhaust section 38. As a non-limiting example, at least a portion of the nacelle 40 can further extend axially forward or upstream the illustrated position. For example, the nacelle 40 can extend axially forward such that a portion of the nacelle 40 overlays or covers a portion of the fan section 18 or a booster section (not illustrated) of the unducted fan turbine engine 10. The nacelle 40 can further include a cowl 100 having an inner barrel 102 and an outer barrel 104, disposed radially outward from the inner barrel 102 with respect to the engine centerline 12. The space between the inner barrel 102 and the outer barrel 104 can define an internal passage 94, which extends circumferentially about a portion of the unducted fan turbine engine 10.

The nacelle 40 can be operatively coupled to the unducted fan turbine engine 10 at an engine split line 84. As a non-limiting example, the cowl 100 can be operatively coupled to the unducted fan turbine engine 10 at or along engine split line 84. Engine split line 84 can extend from a first interface 86 with the inner barrel 102 to a second interface 88 with the outer barrel 104. The first interface 86 and the second interface 88 of engine split line 84 can be axially displaced from one another. As a non-limiting example, the first interface 86 can be axially aft the second interface 88. It will be appreciated, however, that the first interface 86 can be axially positioned forward, aft, or coincide with the second interface 88. As a non-limiting example, engine split line 84 can extend linearly from the first interface 86 to the second interface 88. Alternatively, engine split line 84 can include various non-linear portions along its length. For example, engine split line 84 at the first interface 86 and the second interface 88 can be normal to the engine centerline 12, whereas engine split line between the first interface 86 and the second interface 88 can be obliquely oriented with respect to the engine centerline 12. Engine split line 84 can further extend circumferentially about the engine centerline 12 and include interfaces to the inner barrel 102 and the outer barrel 104 along the entire circumferential extent of the inner barrel 102 and the outer barrel 104. It will be appreciated that the axial location of the first interface 86 and the second interface 88 can vary along the circumference of the inner barrel 102 and the outer barrel 104.

The first interface 86 and the second interface 88 can further denote points of coupling between the cowl 100 and the inner barrel 102 and the outer barrel 104, respectively. As such, the nacelle 40 can be coupled to the unducted fan turbine engine 10. The coupling can be done through any suitable method such as, but not limited to, fastening, adhesion, welding, hinges, or any combination thereof. Additional components can be located along the engine split line 84 to seal the nacelle 40 to the unducted fan turbine engine 10. For example, a series of seals can be provided along the engine split line 84 at the start of the inner barrel 102 or the outer barrel 104 to limit or stop an ingress of fluid from the internal passage 94 an into other portions of the unducted fan turbine engine 10 (e.g., the space between the nacelle 40 and the engine casing 46).

As illustrated, the internal passage 94 can have a varying cross section from the inlet 96 to the outlet 98. Specifically, the cross section of the internal passage 94 can decrease from the engine split line 84 to the outlet 98. As such, the internal passage 94 near the outlet 98 can function as a nozzle and pressurize the fluid flow within the outlet 98 before expelling the fluid from the outlet 98. Alternatively, the internal passage can have a constant cross-sectional area from the inlet 96 to the outlet 98.

As illustrated, during operation of the unducted turbine engine 10, the airflow that flows at least one of over or through the unducted fan turbine engine 10 can be split into three discrete airflows. A first portion of the airflow, defining a first airflow 76, can pass through the engine core 44, a second portion of the airflow, defining a second airflow 78, can pass over the exterior of the nacelle 40, and a third portion of the airflow, defining a third airflow 80, which passes through an interior of the nacelle 40 between the engine core 44 and the exterior of the nacelle 40.

The second airflow 78 can flow around the set of fan blades 42 and over the nacelle 40 of the unducted fan turbine engine 10. Subsequently, the second airflow 78 can flow over at least a portion of the set of stationary fan vanes 82, which can direct the second airflow 78 such that it is transverse toward the engine centerline 12. The second airflow 78 can then flow past the set of stationary fan vanes 82, follow the curvature of the nacelle 40 of the unducted fan turbine engine 10 and toward the exhaust section 38.

The remaining portion of the airflow that is not defined by the second airflow 78 can flow into the unducted fan turbine engine 10 where it is split into the first airflow 76 and the third airflow 80. The first airflow 76 can first flow into the LP compressor 24, which then pressurizes the first airflow 76 thus defining a pressurized airflow that is supplied to the HP compressor 26, which further pressurizes the air. The first airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the first airflow 76, or exhaust gas, is ultimately discharged from the unducted fan turbine engine 10 via the exhaust section 38. The driving of the LP turbine 36 drives the LP spool 50 to rotate the fan 20 and the LP compressor 24. The first airflow 76, including the pressurized airflow and the combustion gases, can define a working airflow that flows through the compressor section 22, the combustion section 28, and the turbine section 32 of the unducted fan turbine engine 10.

The third airflow 80 can flow within the internal passage 94 between the inlet 96 upstream the engine core 44, and the outlet 98 located along a portion of the nacelle 40 of the unducted fan turbine engine 10, specifically along a portion of the nacelle 40. The third airflow 80 can flow from the inlet 96, past the engine split line 84 and into the internal passage 94 of the cowl 100. As illustrated, a portion of the internal passage 94 that the third airflow 80 flows through can be formed as a portion of the unducted fan turbine engine 10, specifically the portion of the internal passage 94 between the inlet 96 and the engine split line 84, while the remaining portion can be formed by the cowl 100. It will be appreciated, however, that the engine split line 84 can be positioned along any portion of the internal passage 94. For example, the engine split line 84 can coincide with the inlet 96 such that the entirety of the internal passage 94 is formed by the cowl 100. The portion of the third airflow 80 that flows out the outlet 98 can then mix with the second airflow 78 and flow toward the aft 16 portions of the unducted fan turbine engine 10. The first airflow 76 that exits the exhaust section 38, the second airflow 78, and the third airflow 80 leaving the outlet 98 can together generate the thrust of the unducted fan turbine engine 10. It is contemplated that the first airflow 76 can generate the majority of the thrust, while the second airflow 78 and the third airflow 80 can generate less thrust than the first airflow 76. As a non-limiting example, the third airflow 80 can generate up to 8% of the thrust of the unducted fan turbine engine 10.

It is contemplated that a portion of the first airflow 76 or the third airflow 80 can be drawn as bleed air (in the case of the first airflow 76, drawing from the compressor section 22). The bleed air can provide an airflow to engine components requiring cooling. The temperature of first airflow 76 entering the combustor 30 is significantly increased. As such, cooling provided by the bleed air is necessary for operating of such engine components in the heightened temperature environments or a hot portion of the unducted fan turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
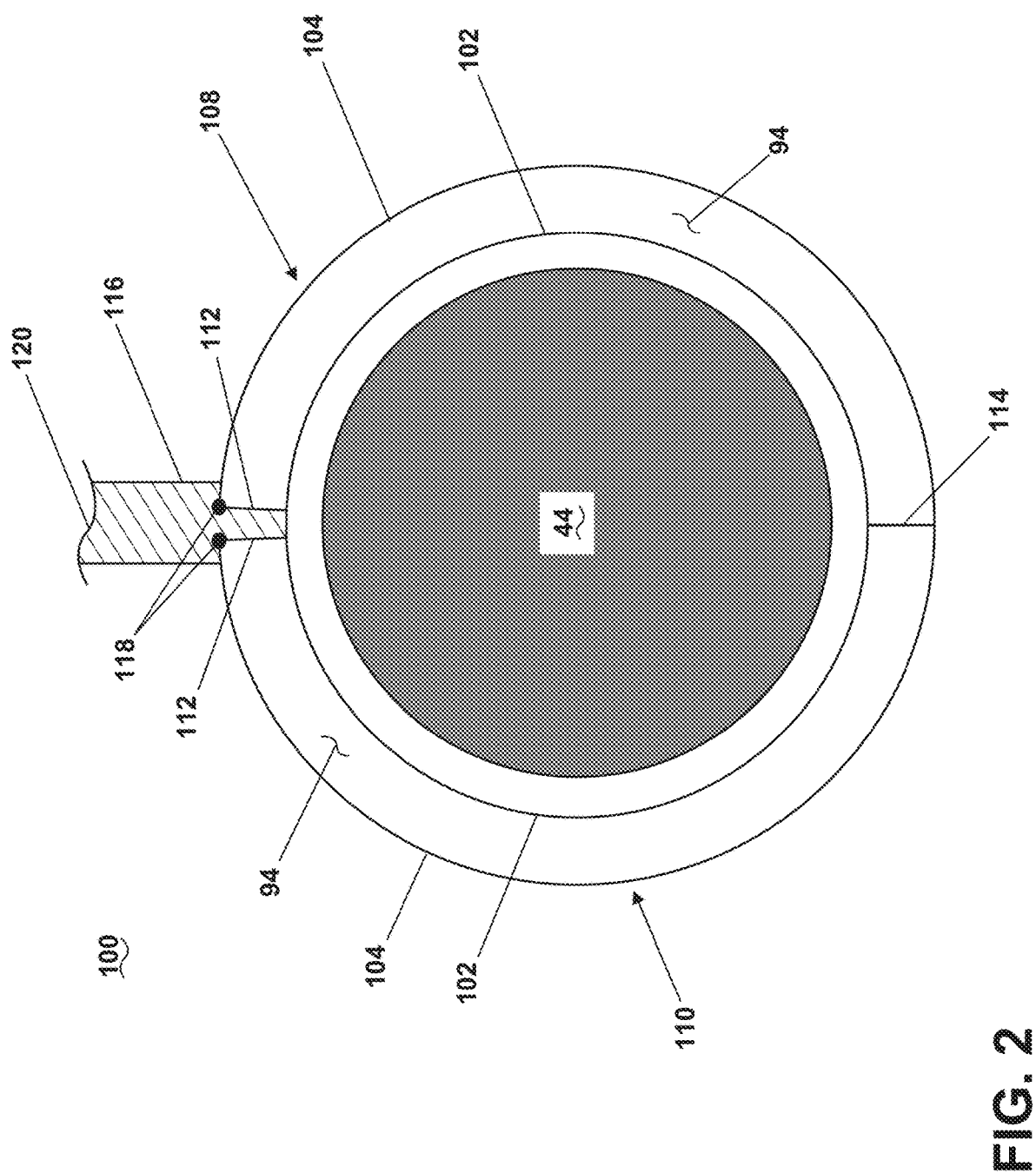
FIG. 2 is a schematic representation of an axial view of the engine taken along section line II-II of FIG. 1, further illustrating a set of hinges operatively coupling a set of cowl doors to an engine mount, the set of cowl doors being in a closed position.

FIG. 2 is a schematic representation of an axial view of the internal passage 94 of the unducted fan turbine engine 10 taken along section II-II of FIG. 1. As discussed herein, the internal passage 94 can at least partially define the third airflow 80 (FIG. 1). A set of cowl doors, specifically a pair of cowl doors, illustrated as a first cowl door 108 and a second cowl door 110, can each define at least a portion of the internal passage 94. As a non-limiting example, the first cowl door 108 and the second cowl door 110 can each be received within a first or closed position. In the closed position, the first cowl door 108 and the second cowl door 110 at least partially envelope the engine core 44. The closed position can further be defined as the positioning of the cowl 100 when the unducted fan turbine engine 10 is in operation.

The first cowl door 108 and the second cowl door 110 can each include a corresponding portion of the inner barrel 102 and the outer barrel 104 defining the radially inner limits and radially outer limits, respectively, of the cowl doors 108, 110. The first cowl door 108 and the second cowl door 110 can extend between a first outer edge 112 and a second outer edge 114 circumferentially displaced from the first outer edge 112. The first outer edge 112 and the second outer edge 114 of the first cowl door 108 confronting the first outer edge 112 and the second outer edge 114, respectively, of the second cowl door 110. The space demarcated by the inner barrel 102, the outer barrel 104, the first outer edge 112, and the second outer edge 114 can define the internal passage 94 formed by the first cowl door 108 and the second cowl door 110.

The first cowl door 108 and the second cowl door 110 can be coupled to one another or to at least a portion of the nacelle 40 when in the closed position, as illustrated. The coupling between the first cowl door 108, the second cowl door 110, or the nacelle 40 can be done through any suitable coupling method such as, but not limited to, latching, fastening, welding, adhesion, magnetism, or any other suitable coupling method. It is contemplated that the first cowl door 108 and the second cowl door 110 can be uncoupled from one another or the nacelle 40, so the coupling can, for example, be a latch extending between the first cowl door 108 and the second cowl door 110 that can be locked or unlocked to either couple or uncouple the first cowl door 108 to the second cowl door 110.

The first cowl door 108 and the second cowl door 110 can each be semi-circular and circumscribe at least a portion of the engine core 44. As such, the internal passage 94 can form an annulus about the engine core 44. The annulus can extend circumferentially about the entirety of the engine core 44. Alternatively, the annulus can circumferentially extend less than the entirety of the outer circumference of the engine core 44. As a non-limiting example, the annulus can extend, in total, at least 240 degrees about the engine core 44. As illustrated, the first cowl door 108 and the second cowl door 110 can be discrete from one another such that the internal passage 94 or the annulus can be discontinuous. In the instance where the set of cowl doors includes the pair of cowl doors 108, 110, the annulus can be defined by two portions that are symmetric about a plane normal to the engine centerline 12 and intersecting a pylon 116. As a non-limiting example, the annulus can be defined by two non-limiting portions that are symmetric about a plane intersecting the pylon 116 and extending in the axial direction. It will be appreciated, however, that there can be any number of two or more portions that defined the annulus. It is further contemplated that the annulus can include a set of struts (not illustrated), which can extend from the inner barrel 102 to the outer barrel 104.

Although illustrated as a circle, it will be appreciated that the cowl 100, and hence the first cowl door 108 and the second cowl 110, can include at least one non-circular portion. For example, at least a portion of the cowl doors 108, 110 can be defined by a linear section, or otherwise non-circular curved sections. As the internal passage 94 is at least partially defined by the cowl doors 108, 110, at least a portion of the internal passage 94 can also be defined by a non-circular portion.

The nacelle 40 can further include an engine mount, which operatively couples the nacelle 40, and hence the unducted fan turbine engine 10, to one or more parts of the aircraft (e.g., a wing or a fuselage of the aircraft). As a non-limiting example, the engine mount is illustrated as the pylon 116 that can operatively couple the nacelle 40, and hence the unducted fan turbine engine 10, to one or more portions of the aircraft. The pylon 116 can be defined by a distal end 120 which can be coupled to at least a portion of the aircraft.

The nacelle 40 can further include a set of hinges 118 located adjacent to pylon 116. As used herein, the term "adjacent to" can otherwise be defined as "near to", "within", or "coupled to". As such, the set of hinges 118 can be adjacent to, near to, within, or otherwise coupled to the pylon 116. The set of hinges 118 can operatively couple the first cowl door 108 and the second cowl door 110 to the nacelle 40 or the pylon 116. Specifically, the set of hinges 118 can be operatively coupled to the first outer edge 112 of the corresponding first cowl door 108 or second cowl door 110. The set of hinges 118 can be located where the outer barrel 104 and the first outer edge 112 meet. As such, the first outer edge 112 can be defined as a hinge edge of the corresponding first cowl door 108 and second cowl door 110. As illustrated, the set of hinges 118 are provided near a portion of the pylon 116 that is opposite the distal end 120. As such, the set of cowl doors 108, 110 can be radially spaced from the distal end 120 of the pylon 116.

Although illustrated in a two-dimensional along the engine split line 84, it will be appreciated that aspects of the nacelle 40, the first cowl door 108 and the second cowl door 110 can be defined by similar features along the entirety of the cowl 100. For example, the pylon 116 can be located only at the engine split line 84. Alternatively, the pylon 116 can be located along any one or more suitable portion of the cowl 100 or nacelle 40. Similarly, the set of hinges 118 can be axially spaced from one another such that each cowl door 108, 110 is coupled to any number of one or more hinges 118.

It will be further appreciated that there can be any number of first cowl doors 108 or second cowl doors 110 axially displaced along the cowl 100. As a non-limiting example, there can be two second cowl doors 110, with one of the second cowl doors 110 being axially forward or upstream the other second cowl door 110. In other words, the two second cowl doors 110 are axially displaced from one another. Axially displaced first cowl doors 108 and second cowl doors 110 can allow for doors to be positioned along the axial extent of the cowl 100 so as to allow for the selective access to various portions of the engine core 44 or the unducted fan turbine engine 10 along the axial extent of the cowl 100. It will be further appreciated that a first cowl door 108 or a second cowl door 110 can be formed within another first cowl door 108 or a second cowl door 110, respectively. As a non-limiting example, there can be two first cowl doors 108, with one of the first cowl doors 108 being smaller than the other first cowl door 108. The smaller of the two first cowl doors 108 can be positioned along the larger first cowl door 108 and be operatively coupled to the larger first cowl door 108 through a set of hinges, or otherwise be removable from the larger first cowl door 108. This can allow for selective access to specific portions of the unducted fan turbine engine 10 without the need for opening the larger of the two first cowl doors 108. There can be any number of smaller cowl doors 108, 110 placed along larger cowl doors 108, 110.

Figure 3:
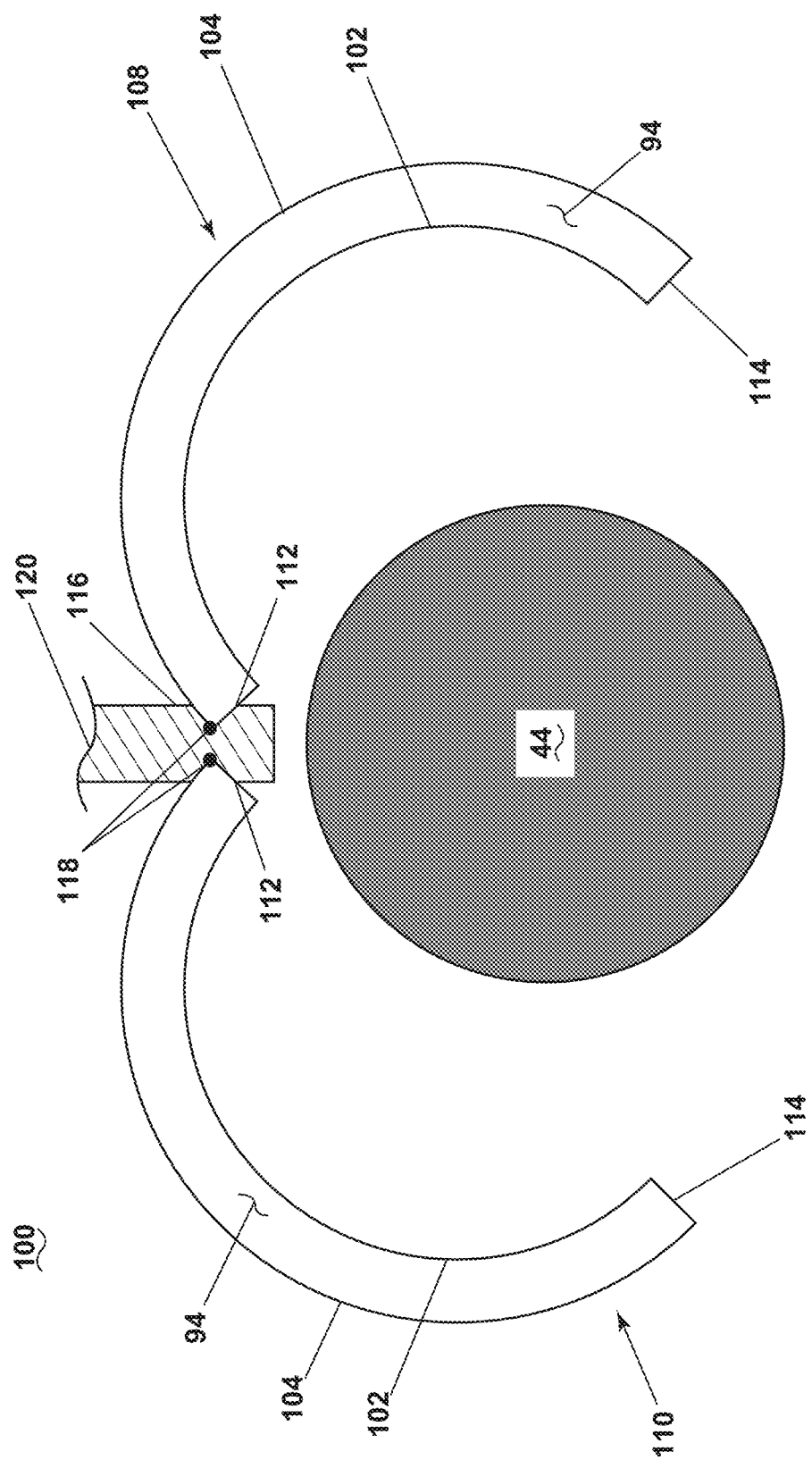
FIG. 3 is a schematic representation of an axial view of the cowl of FIG. 2, with the set of cowl doors being in an opened position.

FIG. 3 is a schematic representation of an axial view of the unducted fan turbine engine 10 taken along section II-II of FIG. 1, further illustrating the first cowl door 108 and the second cowl door 110 of FIG. 2 in a second or opened position. In the opened position, at least one of the first cowl door 108 or the second cowl door 110 are at least partially radially displaced from the closed position of FIG. 2. In the opened position, at least a portion of the engine core 44 is exposed, thus allowing for access of the engine core 44. The opened position can further be defined as the positioning of the cowl 100 when the unducted fan turbine engine 10 is not in operation. As illustrated, both of the first cowl door 108 and the second cowl door 110 are opened, however, while both cowl doors 108, 110 are shown in the opened position, it will be appreciated that the cowl doors 108, 110 can be opened independently of one another. For example, the first cowl door 108 could be at least partially opened or in the opened position, while the second cowl door 110 remained closed or in the closed position.

The first cowl door 108 and the second cowl door 110 can each pivot about a respective portion of the set of hinges 118 similar to that of a gull-wing door or a clamshell door. As such, the first cowl door 108 and the second cowl door 110 can be defined as a set of gull-wing doors.

The first cowl door 108 and the second cowl door 110 can be moveable between the closed position (FIG. 2) and the opened position (FIG. 3) so as to allow for selective access to the engine core 44 or any other unducted fan turbine engine 10 components (e.g., an accessory gearbox, electronics, a generator, or any other suitable component within the nacelle 40). One non-limiting use for the moveable cowl doors 108, 110 is to provide for easy-access to the engine core 44 during maintenance work. As discussed herein, the cowl doors 108, 110 can be easily uncoupled from one another, as such, when maintenance is needed to be done, the cowl doors 108, 110 can be uncoupled and pivoted about the set of hinges 118, thus moving at least one of the first cowl door 108 or the second cowl door 110 from the closed position to the opened position to allow for access to the engine core or any other unducted fan turbine engine 10 components. When maintenance is done, the first cowl door 108 and the second cowl door 110 can be closed (e.g., the closed position) and coupled to one another, thus securing the engine core 44 within the nacelle 40.

Figure 4:
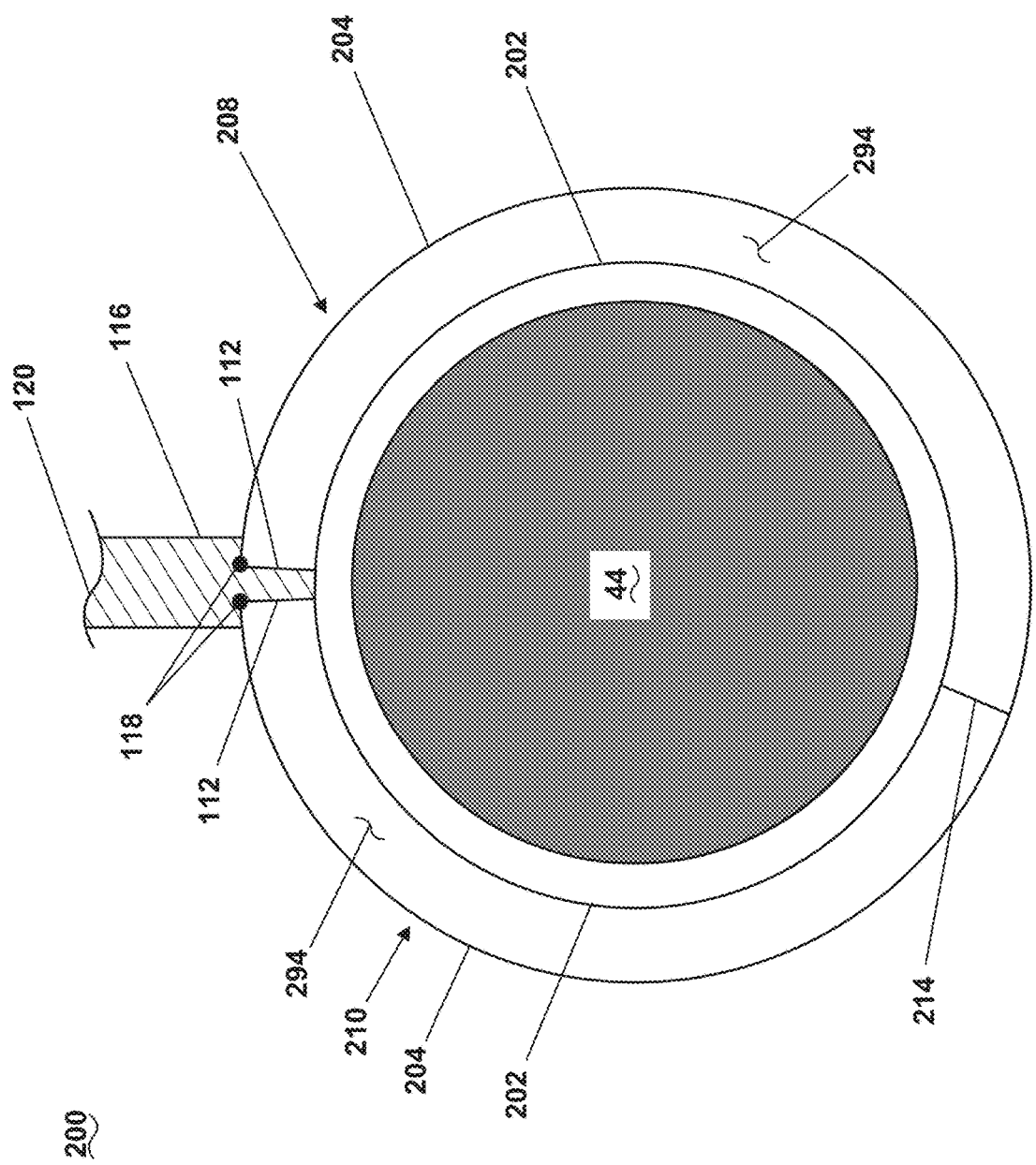
FIG. 4 is a schematic representation of an axial view of an exemplary cowl of FIG. 2, including an exemplary cowl door.

FIG. 4 is a schematic representation of an axial view of an exemplary cowl 200 of FIG. 2. The exemplary cowl 200 is similar to the cowl 100; therefore, like parts will be identified with like numerals in the 200 series, with it being understood that the description of like parts of the cowl 100 applies to the cowl 200, unless otherwise noted.

The cowl 200, as illustrated, is in a closed position (e.g., similar to that illustrated in FIG. 2) and is moveable between the closed position and an opened position (e.g., to that illustrated in FIG. 3). The cowl 200 includes a first cowl door 208 and a second cowl door 210, with each including a corresponding portion of an inner barrel 202 and an outer barrel 204. Both the first cowl door 208 and the second cowl door 210 can extend in the circumferential direction between the first outer edge 112, coupled to the set of hinges 118 adjacent to the pylon 116 and radially opposite the distal end 120 of the pylon 116, and a second outer edge 214 defined as a circumferentially distal end of the first cowl door 208 and the second cowl door 210 with respect to the first outer edge 112. An internal passage 294 can be demarcated by the inner barrel 202, the outer barrel 204, the first outer edge 112, and the second outer edge 214, and be located within the first cowl door 208 and the second cowl door 210.

The first cowl door 208 and the second cowl door 210 can circumferentially envelope at least a portion of the engine core 44. As illustrated, the first cowl door 208 can extend circumferentially across the engine core 44 for a larger circumferential extent than the second cowl door 210. The first cowl door 208 can extend across greater than 180 degrees about the engine core 44, whereas the second cowl door 210 can extend less than 180 degrees about the engine core 44. In other words, the first cowl door 208 and the second cowl door 210 are non-symmetric about a plane normal to the engine centerline 12 and intersecting the pylon 116. It will be appreciated that the first cowl door 208 can include a circumferential length any times greater than a circumferential length of the second cowl door 210. In one non-limiting example, the first cowl door 208 can extend across the entirety of the circumferential extend of the first cowl door 208 and the second cowl door 210, such that the cowl 200 includes only the first cowl door 208. Alternatively, the second cowl door 210 can be any times greater in circumferential length than the first cowl door 208, or be defined such that the second cowl door 210 extends across the entire circumferential extent of the first cowl door 208.

Figure 5:
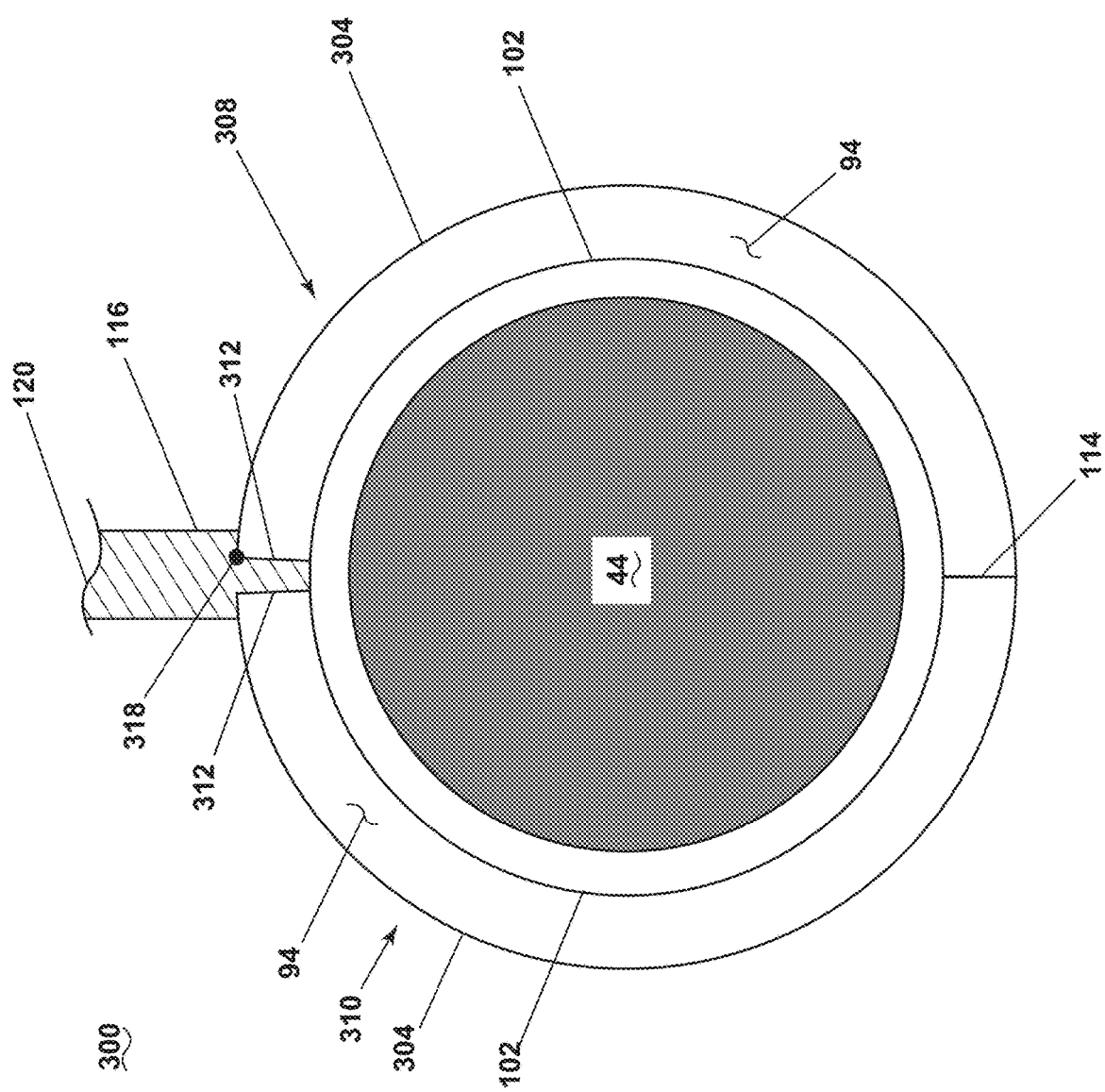
FIG. 5 is a schematic representation of an axial view of an exemplary cowl of FIG. 2, including an exemplary hinge.

FIG. 5 is a schematic representation of an axial view of an exemplary cowl 300 of FIG. 2. The exemplary cowl 300 is similar to the cowl 100, 200; therefore, like parts will be identified with like numerals in the 300 series, with it being understood that the description of like parts of the cowl 100, 200 applies to the cowl 300, unless otherwise noted.

The cowl 300 includes a first cowl door 308 and a second cowl door 310, with each including a corresponding portion of the inner barrel 302 and an outer barrel 304. Both the first cowl door 308 and the second cowl door 310 can extend in the circumferential direction between a first outer edge 312, adjacent to the pylon 116 and radially opposite the distal end 120 of the pylon 116, and the second outer edge 114 defined as a circumferentially distal end of the first cowl door 308 and the second cowl door 310 with respect to the first outer edge 312. The internal passage 94 can be demarcated by the inner barrel 302, the outer barrel 304, the first outer edge 312, and the second outer edge 114, and be located within the first cowl door 308 and the second cowl door 310.

A hinge 318 can be coupled to a portion of the pylon 116, and one of the first outer edge 312 or hinge edge of the first cowl door 308 or the second cowl door 310. As such, the hinge 318 can operatively couple one of either the first cowl door 308 or the second cowl door 310 to the pylon 116. As a non-limiting example, the hinge 318 can be coupled to only the first cowl door 308 where the outer barrel 304 and the first outer edge 312 meet. As such, only the first cowl door 308 is moveable between a closed position, as illustrated, or an opened position (e.g., similar to that illustrated in FIG. 3). Alternatively, the hinge 318 can operatively couple only the second cowl door 310 to the nacelle 40 such that only the second cowl door 310 is operatively moveable between the closed position and the opened position.

Figure 6:
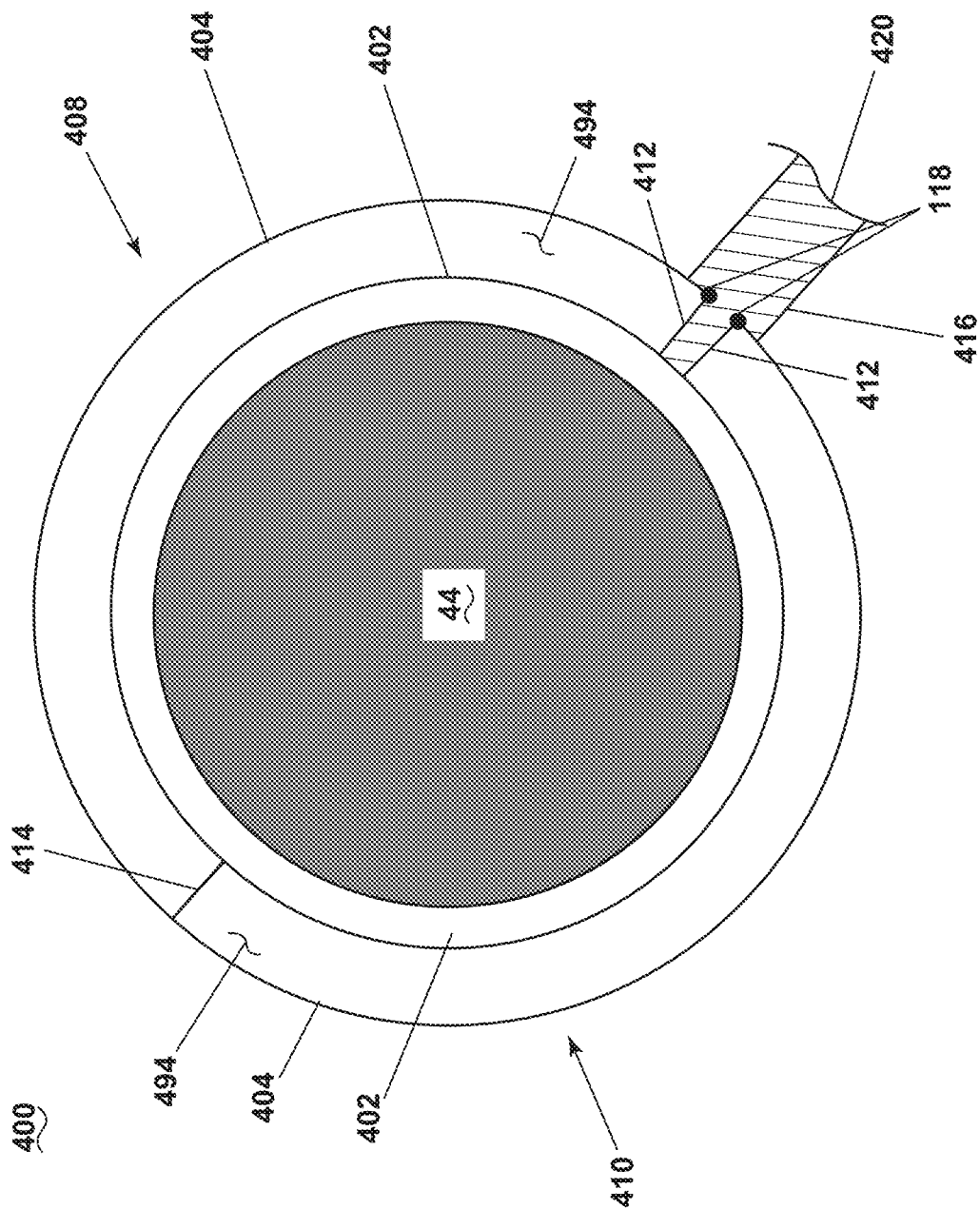
FIG. 6 is a schematic representation of an axial view of an exemplary cowl of FIG. 2, including an exemplary engine mount.

FIG. 6 is a schematic representation of an axial view of an exemplary cowl 400 of FIG. 2. The exemplary cowl 400 is similar to the cowl 100, 200, 300; therefore, like parts will be identified with like numerals in the 400 series, with it being understood that the description of like parts of the cowl 100, 200, 300 applies to the cowl 400, unless otherwise noted.

The cowl 400, as illustrated, is in a closed position (e.g., similar to that illustrated in FIG. 2) and is moveable between the closed position and an opened position (e.g., to that illustrated in FIG. 3). The cowl 400 includes a first cowl door 408 and a second cowl door 410, similar to the first cowl door 108 and the second cowl door 110 (FIG. 2), respectively, with each including a corresponding portion of an inner barrel 402 and an outer barrel 404. The cowl 400 is similar to the cowl 100 (FIG. 2), except that a pylon 416 is circumferentially offset with respect to the pylon 116 illustrated in FIG. 2. As such, the entirety of the cowl 400 is circumferentially offset with respect to the cowl 100. The cowl 400 is a non-limiting example illustrating the pylon 416 in a differing position. It will be appreciated that the pylon 416 can be moved along any portion of the circumferential extent of the cowl 400 and be dependent on how the unducted fan turbine engine 10 is being mounted to a respective environment (e.g., an aircraft). Both the first cowl door 408 and the second cowl door 410 can extend in the circumferential direction between a first outer edge 412, coupled to the set of hinges 418 adjacent to the pylon 116 and radially opposite a distal end 420 of the pylon 116, and a second outer edge 414 defined as a circumferentially distal end of the first cowl door 408 and the second cowl door 410 with respect to the first outer edge 412. The pylon 116 can be defined by the distal end 420 which can be coupled to at least a portion of the aircraft. As illustrated, the second outer edge 414 can be displaced 180 degrees from the pylon 416. As such, the first cowl door 408 and the second cowl door 410 can be symmetric. It will be appreciated, however, that the second outer edge 414 can be displaced more or else than 180 degrees from the pylon 416. As such, the first cowl door 408 and the second cowl door 410 can be non-symmetric, similar to the first cowl door 208 and the second cowl door 210 (FIG. 4), respectively. The illustrated cowl 100 in FIG. 2 can, for example, be used to mount the unducted fan turbine engine 10 to an underside of a wing, whereas the cowl 400 in FIG. 6 can be used to mount the unducted fan turbine engine 10 to the side of a fuselage.

Figure 7:
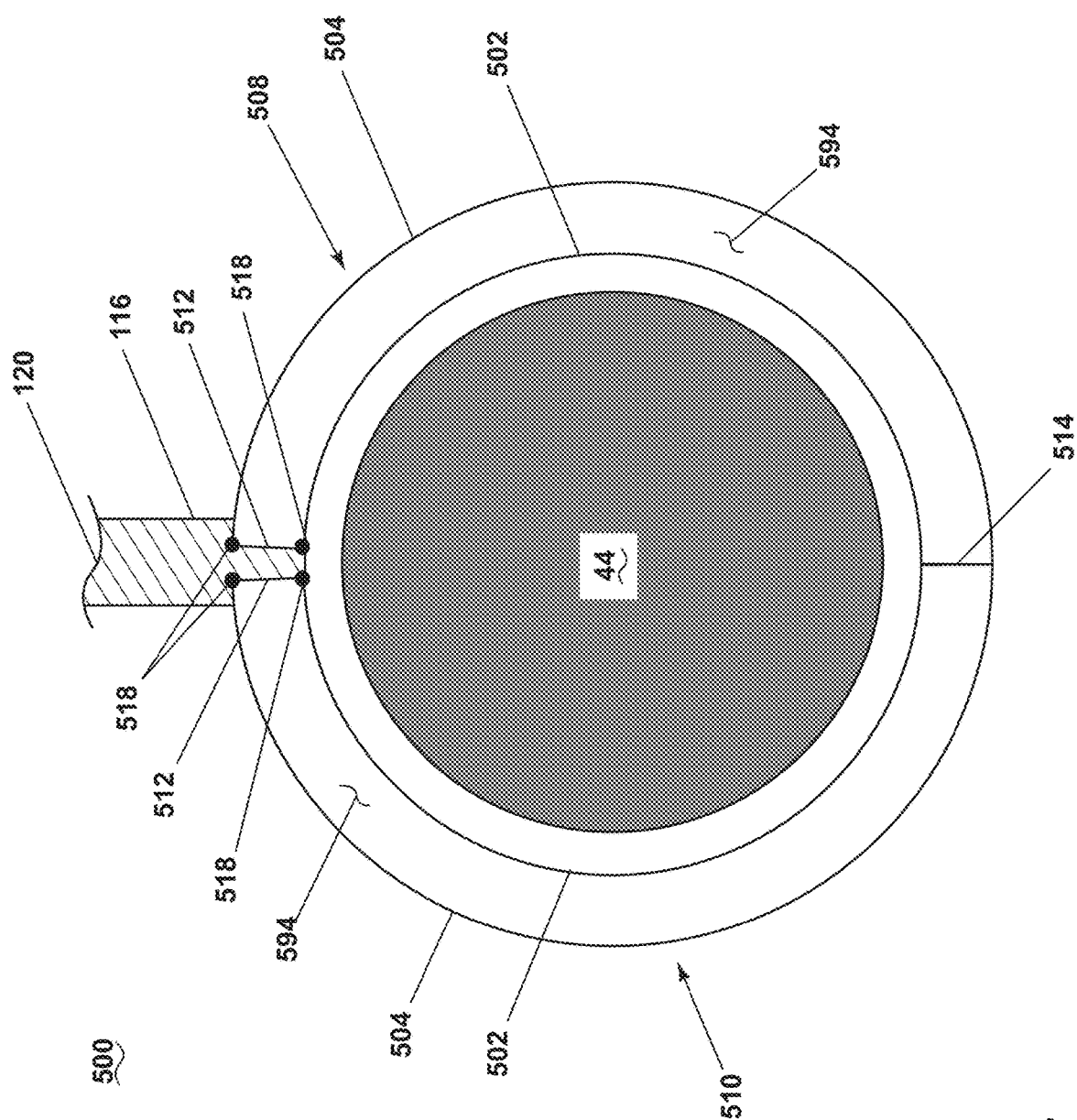
FIG. 7 is a schematic representation of an axial view of an exemplary cowl of FIG. 2, including a set of exemplary hinges, the exemplary set of cowl doors in a closed position.

FIG. 7 is a schematic representation of an axial view of an exemplary cowl 500 of FIG. 2. The exemplary cowl 500 is similar to the cowl 100, 200, 300, 400; therefore, like parts will be identified with like numerals in the 500 series, with it being understood that the description of like parts of the cowl 100, 200, 300, 400 applies to the cowl 500, unless otherwise noted.

The cowl 500, as illustrated, is in closed position (e.g., similar to that illustrated in FIG. 2) and is moveable between the closed position and an opened position (e.g., to that illustrated in FIG. 3). The cowl 500 includes a first cowl door 508 and a second cowl door 510, with each including a corresponding portion of an inner barrel 502 and an outer barrel 504. Both the first cowl door 508 and the second cowl door 510 can extend in the circumferential direction between a first outer edge 512, adjacent to the pylon 116 and radially opposite the distal end 120 of the pylon 116, and a second outer edge 514 defined as a circumferentially distal end of the first cowl door 508 and the second cowl door 510 with respect to the first outer edge 512. An internal passage 594 can be demarcated by the inner barrel 502, the outer barrel 504, the first outer edge 512, and the second outer edge 514, and be located within the first cowl door 508 and the second cowl door 510.

A set of hinges 518, adjacent the pylon 116, can operatively couple the first cowl door 508 and the second cowl door 510 to the nacelle 40. As illustrated, the set of hinges 518 can be coupled to the first cowl door 508 and the second cowl door 510 in radially differing positions. Specifically, the set of hinges 518 can couple to the first cowl door 508 and the second cowl door 510 where the inner barrel 502 meets the first outer edge 512 and where the outer barrel 504 meets the first outer edge 512. Alternatively, any combination of couplings can be possible. For example, the set of hinges 518 can be located only where the inner barrel 502 meets the first outer edge 512, or the set of hinges 518 can be located where the inner barrel 502 meets the first outer edge 512 on one of the doors 508, 510, and where the outer barrel 504 meets the first outer edge 512 on the other of the doors 508, 510.

Figure 8:
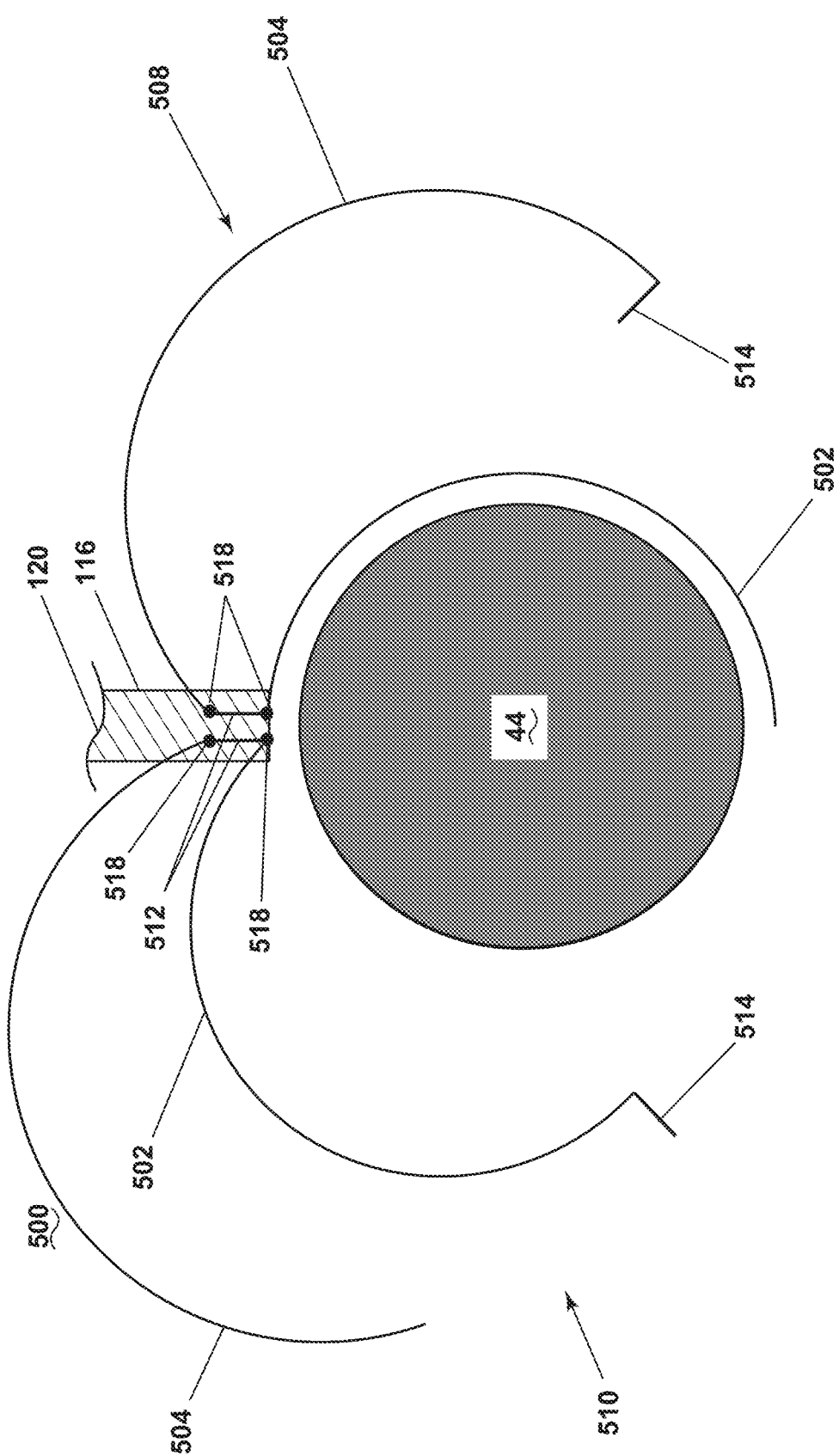
FIG. 8 is a schematic representation of an axial view of the exemplary cowl of FIG. 7, including the exemplary set of cowl doors in an opened position.

FIG. 8 is a schematic representation of an axial view of the exemplary cowl 500 of FIG. 7, with the first cowl door 508 and the second cowl door 510 being in an opened position.

As illustrated, the inner barrel 502 and the outer barrel 504 of the first cowl door 508 and the second cowl door 510 can be moved independently of one another as the set of hinges 518 are coupled directly to where the inner barrel 502 and the outer barrel 504 meets the first outer edge 512. As such, the inner barrel 502 and the outer barrel 504 of each the first cowl door 508 and the second cowl door 510 can be moved to differing degrees of openness or differing positions. For example, as illustrated, the inner barrel 502 of the first cowl door 508 can remain in the closed position, while the outer barrel 504 of the first cowl door 510 can be at least partially opened. Further yet, either of the inner barrel 502 or the outer barrel 504 can include a portion defining the second outer edge 514. As illustrated, the outer barrel 504 of the first cowl door 508, and the inner barrel 502 of the second cowl door 510 can include the second outer edge 514 extending radially outward from the outer barrel 504 and the inner barrel 502, respectively. Alternatively, either or both of the inner barrel 502 or the outer barrel 504 can include at least a portion of the second outer edge 514.

Figure 9:
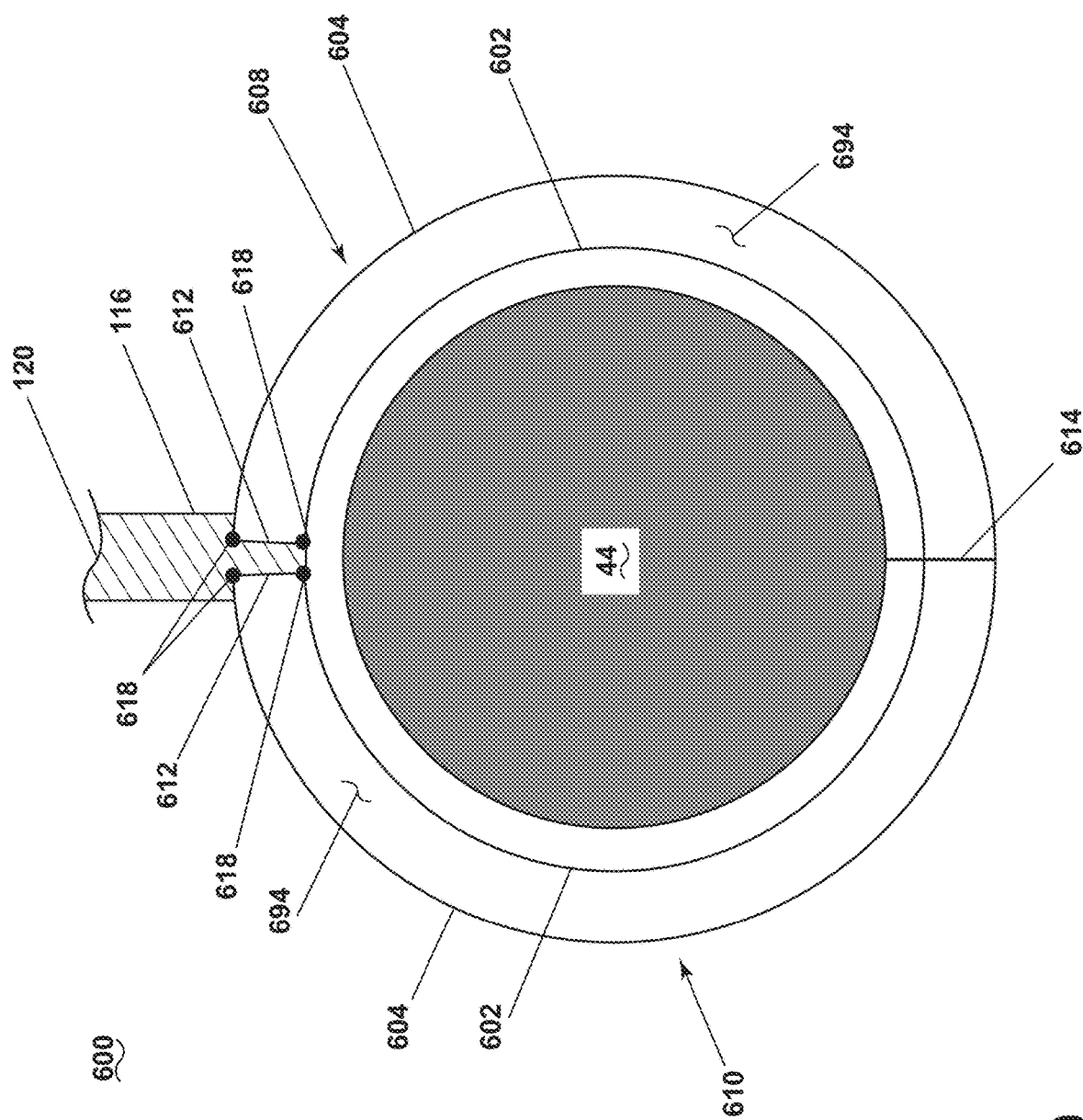
FIG. 9 is a schematic representation of an axial view of an exemplary cowl of FIG. 2, including an exemplary outer edge of the exemplary set of cowl doors, the exemplary set of cowl doors in a closed position.

FIG. 9 is a schematic representation of an axial view of an exemplary cowl 600 of FIG. 2. The exemplary cowl 600 is similar to the cowl 100, 200, 300, 400, 500; therefore, like parts will be identified with like numerals in the 600 series, with it being understood that the description of like parts of the cowl 100, 200, 300, 400, 500 applies to the cowl 600, unless otherwise noted.

The cowl 600, as illustrated, is in closed position (e.g., similar to that illustrated in FIG. 2) and is moveable between the closed position and an opened position (e.g., to that illustrated in FIG. 3). The cowl 600 includes a first cowl door 608 and a second cowl door 610, with each including a corresponding portion of an inner barrel 602 and an outer barrel 604. Both the first cowl door 608 and the second cowl door 610 can extend in the circumferential direction between a first outer edge 612, adjacent to the pylon 116 and radially opposite the distal end 120 of the pylon 116, and a second outer edge 614 defined as a circumferentially distal end of the first cowl door 608 and the second cowl door 610 with respect to the first outer edge 612. An internal passage 694 can be demarcated by the inner barrel 602, the outer barrel 604, the first outer edge 612, and the second outer edge 614, and be located within the first cowl door 608 and the second cowl door 610.

The cowl 600 can include a set of hinges 618, adjacent the pylon 116, that can operatively couple the first cowl door 508 and the second cowl door 510 to the nacelle 40. The cowl 600 is similar to the cowl 500 in that it includes the set of hinges 518 that can be coupled to the first cowl door 608 and the second cowl door 610 in radially differing positions.

As illustrated, the second outer edge 614 can extend radially inwardly from the inner barrel 602. As a non-limiting example, the second outer edge 614 can be defined as a portion of the unducted fan turbine engine 10. The second outer edge 614 can extend from at least a portion of the engine core 44 and extend between the circumferentially distal ends, with respect to the first outer edge 612, of the first cowl door 608 and the second cowl door 610. The second outer edge 614 can further be defined as, but is not limited to, a beam, a wall, plate, or a sheet extending from the engine core 44 and confronting the circumferentially distal ends of the first cowl door 608 and the second cowl door 610, with respect to the first outer edge 612. The second outer edge 614 can further be defined as a point of coupling for the first cowl door 608 and the second cowl door 610 to the engine core 44. For example, when in the illustrated position, at least a portion of the first cowl door 608 and the second cowl door 610 can be coupled to the second outer edge 614 by any suitable coupling methods such as, but not limited to, welding, adhesion, magnetism, fastening, bolting, or any combination thereof.

Figure 10:
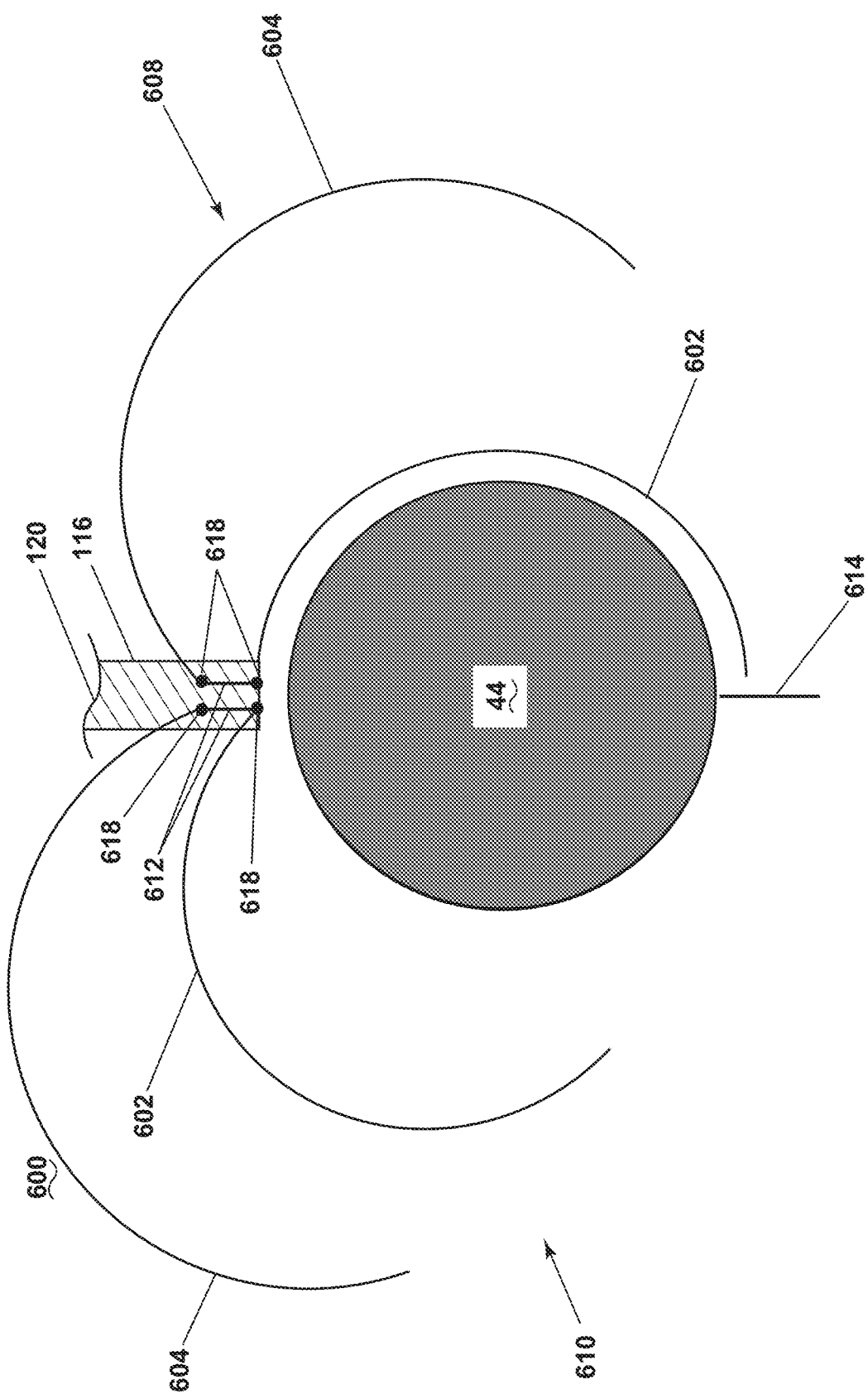
FIG. 10 is a schematic representation of an axial view of the exemplary cowl of FIG. 9, including the exemplary set of cowl doors in an opened position.

FIG. 10 is a schematic representation of an axial view of the exemplary cowl 600 of FIG. 9, with the first cowl door 608 and the second cowl door 610 being in an opened position.

As illustrated, when the inner barrel 602 or the outer barrel 604 are moved, or otherwise opened, the second outer edge 614 can remain in the position illustrated in FIG. 9. It is contemplated that the cowl 600 can be used to allow for the selective access of the internal passage 694, the engine core 44, or other portions of the unducted fan turbine engine 10. For example, the internal passage 694 (FIG. 9), defined at least partially by the inner barrel 602 and the outer barrel 604, can be accessed by only moving a portion of the outer barrel 604. As such, the space between the inner barrel 602 and the outer barrel 604 is opened up or otherwise exposed, thus allow for access to the internal passage 694.

Benefits of the present disclosure include a cowl door for a turbine engine, specifically a unducted fan turbine engine, that increases the thrust of the turbine engine when compared to conventional turbine engines. For example, conventional turbine engines can include cowl doors that are included within the nacelle and moveable or removeable from the nacelle to provide access to the engine core. The cowl doors as described herein, however, allow for selective access to at least a portion of the unducted fan turbine engine (e.g., the engine core, the internal passage, the space between the cowl doors and the engine core, etc.) while also defining at least a portion of the internal passage, which as discussed herein, can include a third airflow that adds to the total thrust of the unducted fan turbine engine. Specifically, the third airflow can flow from the inlet within the unducted fan turbine engine, through a portion of the internal passage at least partially demarcated by the inner barrel and the outer barrel of the cowl doors, and out the outlet and onto the exterior of the unducted fan turbine engine where it can merge with at least a portion of the second airflow. As such, the third airflow can contribute to the overall thrust of the unducted fan turbine engine, whereas conventional cowl doors do not contribute to the overall thrust of the turbine engine at all. Further yet, the third airflow can contribute to the thrust of the unducted fan turbine engine without the need for combustion, or additional components (e.g., rotating blades or stationary vanes). Specifically, the cowl doors are formed such that the third airflow is directed onto the exterior surface of the unducted fan turbine engine solely by flowing through the internal passage at least partially defined by the cowl doors. There are no additional components needed to generate this thrust. As such, the inclusion of the cowl doors as described herein allow for not only selective access of portions of the turbine engine, but they also add to the overall thrust of the turbine engine, thereby increasing the overall efficiency of the turbine engine when compared to conventional turbine engines.

Further benefits of the present disclosure include a cowl door for a turbine engine, specifically a unducted fan turbine engine, that allow for easy, selective access to the engine core or other portions of the turbine engine when compared to conventional turbine engines. For example, conventional turbine engines can include a set of cowl doors that can be coupled to a nacelle through conventional coupling methods such as, welding, fastening, or adhesion. As such, the cowl doors need to be physically uncoupled before they access to the engine core is obtained. This process can ultimately be very time consuming. The turbine engine as described herein, however, includes the set of cowl doors that are moveable between a closed position and an opened position through a set of hinges, thus allowing for selective access to at least a portion of the turbine engine. The set of cowl doors are not coupled to the nacelle through the conventional coupling methods. As such, the set of cowl doors can be easily moved between opened and closes positions and secured in the closed position without need for extensive amounts of coupling. This, in turn, reduces the time needed to detach or move the cowl doors when compared to the time needed to detach or remove the cowl doors of conventional turbine engines.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Combinations or permutations of features described herein are covered by this disclosure. Many other possible embodiments and configurations in addition to that shown in the above figures are contemplated by the present disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

An unducted fan turbine engine comprising an engine core having in serial, axial flow arrangement a compressor section, a combustor section, and a turbine section and defining a first airflow axially through the engine core, a nacelle circumscribing at least a portion of the engine core and having an exterior surface defining a second airflow along the exterior surface and an internal passage located between the exterior surface and the engine core and defining a third airflow, a plurality of rotatable blades extending radially beyond the exterior of the surface of the nacelle and rotationally driven by the engine core, and a cowl door located in the nacelle and movable between opened and closed positions to provide selective access to at least a portion of the engine core, wherein the cowl door has an interior forming at least a portion of the internal passage.

The unducted fan turbine engine of any preceding clause, wherein the cowl door comprises an inner barrel and an outer barrel located radially outward from the inner barrel with respect to the engine core, a space between the inner barrel and the outer barrel defining at least a portion of the internal passage.

The unducted fan turbine engine of any preceding clause, wherein the nacelle comprises a hinge mounting the cowl door to the nacelle.

The unducted fan turbine engine of any preceding clause, wherein the nacelle further comprises an engine mount and the hinge are located adjacent the engine mount.

The unducted fan turbine engine of any preceding clause, wherein the cowl door comprises a pair of cowl doors, with the nacelle having a hinge for each cowl door, with each hinge located adjacent the engine mount.

The unducted fan turbine engine of any preceding clause, wherein the pair of cowl doors are gull wing doors, with each door have a hinge edge, coupled to the corresponding hinge such that at least one of the inner barrel or the outer barrel of each gull wing door is moveable between opened and closed positions, and outer edges confronting each other.

The unducted fan turbine engine of any preceding clause, wherein the cowl door comprises a pair of gull wing doors.

The unducted fan turbine engine of any preceding clause, wherein each door of the pair of gull wing doors each extend 180 degrees about the engine core.

The unducted fan turbine engine of any preceding clause, wherein the internal passage forms an annulus about the engine core.

The unducted fan turbine engine of any preceding clause, wherein the annulus is discontinuous.

The unducted fan turbine engine of any preceding clause, wherein the annulus extends, in total, at least 240 degrees about the engine core.

The unducted fan turbine engine of any preceding clause, wherein the plurality of blades is axially upstream of the combustor section.

The unducted fan turbine engine of any preceding clause, wherein the plurality of blades is axially downstream of the combustor section.

The unducted fan turbine engine of any preceding clause, further comprising a gearbox coupling the plurality of blades to the engine core.

The unducted fan turbine engine of any preceding clause, further comprising a plurality of stationary vanes extending radially beyond the exterior surface of the nacelle and downstream from the plurality of rotatable blades.

The unducted fan turbine engine of any preceding clause, wherein the cowl door extends across 180 degrees of the engine core.

An unducted fan turbine engine comprising an engine core having in serial, axial flow arrangement a compressor section, a combustor section, and a turbine section and defining a first airflow axially through the engine core, a nacelle circumscribing at least a portion of the engine core and having an exterior surface defining a second airflow along the exterior surface and an internal passage located between exterior surface and the engine core and defining a third airflow, a plurality of rotatable blades extending radially beyond the exterior of the surface of the nacelle and rotationally driven by the engine core, and a pair of gull wing doors located in the nacelle and moveable between opened and closed positions to provide selective access to at least a portion of the engine core, wherein the pair of gull wing doors each have an interior forming at least a portion of the internal passage.

The unducted fan turbine engine of any preceding clause, wherein each door of the pair of gull wing doors includes an inner barrel and an outer barrel located radially outward from the inner barrel with respect to the engine core, a space between the inner barrel and the outer barrel defining at least a portion of the internal passage, the unducted fan turbine engine further comprising an engine mount, and a hinge for each gull wing door, the hinge adjacent the engine mount and mounting the pair of gull wing doors to the nacelle, wherein the pair of gull wing doors include a hinge edge, coupled to the corresponding hinge such that at least one of the inner barrel or the outer barrel of each gull wing door is moveable between opened and closed positions, and outer edges confronting each other.

The unducted fan turbine engine of any preceding clause, wherein the internal passage forms an annulus about the engine core, extending, in total, at least 240 degrees about the engine core.

The unducted fan turbine engine of any preceding clause, wherein the annulus is discontinuous and symmetric about a plane intersecting the engine mount and extending in the axial direction.

What is claimed is:

1. An unducted fan turbine engine comprising:
an engine core having in serial, axial flow arrangement a compressor section, a combustor section, and a turbine section and defining a first airflow axially through the engine core;
a nacelle circumscribing at least a portion of the engine core and having an exterior surface defining a second airflow along the exterior surface and an internal passage located between the exterior surface and the engine core and defining a third airflow;
a plurality of rotatable fan blades extending radially beyond the exterior surface of the nacelle and rotationally driven by the engine core; and
a cowl door located in the nacelle and movable between opened and closed positions to provide selective access to at least a portion of the engine core, wherein the cowl door has an interior forming at least a portion of the internal passage;
wherein the internal passage formed by the interior extends continuously over a circumferential area that extends greater than 90 degrees about the engine core.

2. The unducted fan turbine engine of claim 1, wherein the cowl door comprises an inner barrel and an outer barrel located radially outward from the inner barrel with respect to the engine core, a space between the inner barrel and the outer barrel defining at least a portion of the internal passage.

3. The unducted fan turbine engine of claim 2, wherein the nacelle comprises a hinge mounting the cowl door to the nacelle.

4. The unducted fan turbine engine of claim 3, wherein the nacelle further comprises an engine mount and the hinge is located adjacent the engine mount.

5. The unducted fan turbine engine of claim 4, wherein the cowl door comprises a pair of cowl doors, with the nacelle having a hinge for each cowl door, with each hinge located adjacent the engine mount.

6. The unducted fan turbine engine of claim 1, wherein the cowl door comprises a pair of gull wing doors.

7. The unducted fan turbine engine of claim 6, wherein each door of the pair of gull wing doors extends 180 degrees about the engine core.

8. The unducted fan turbine engine of claim 1, wherein the internal passage extends discontinuously about the engine core.

9. The unducted fan turbine engine of claim 8, wherein the internal passage extends, in total, at least 240 degrees about the engine core.

10. The unducted fan turbine engine of claim 1, wherein the plurality of rotatable fan blades is axially upstream of the combustor section.

11. The unducted fan turbine engine of claim 1, wherein the plurality of rotatable fan blades is axially downstream of the combustor section.

12. The unducted fan turbine engine of claim 1, further comprising a gearbox coupling the plurality of rotatatable fan blades to the engine core.

13. The unducted fan turbine engine of claim 1, further comprising a plurality of stationary fan vanes extending radially beyond the exterior surface of the nacelle and downstream from the plurality of rotatable fan blades.

14. The unducted fan turbine engine of claim 1, wherein the cowl door extends across 180 degrees of the engine core.

15. An unducted fan turbine engine having an engine centerline and comprising:
an engine core having in serial, axial flow arrangement a compressor section, a combustor section, and a turbine section and defining a first airflow axially through the engine core;
a nacelle circumscribing at least a portion of the engine core and having an exterior surface defining a second airflow along the exterior surface and an internal passage located between exterior surface and the engine core and defining a third airflow;
a plurality of rotatable fan blades extending radially beyond the exterior surface of the nacelle and rotationally driven by the engine core; and
a pair of gull wing doors including a first gull wing door and a second gull wing door each extending between a first outer edge and a second outer edge, the pair of gull wing doors being located in the nacelle and moveable between opened and closed positions to provide selective access to at least a portion of the engine core, wherein the pair of gull wing doors each have an interior forming at least a portion of the internal passage,
wherein the second outer end of the first gull wing door of the pair of gull wing doors confronts the second outer end of the second gull wing door of the pair of gull wing doors when the pair of gull wing doors are in the closed position, and the pair of gull wing doors are non-symmetric about a vertical plane extending along the engine centerline and intersecting the second outer end of the first gull wing door and the second gull wing door when the pair of gull wing doors are in the closed position.

16. The unducted fan turbine engine of claim 15, wherein each door of the pair of gull wing doors includes an inner barrel and an outer barrel located radially outward from the inner barrel with respect to the engine core, a space between the inner barrel and the outer barrel defining at least a portion of the internal passage, the unducted fan turbine engine further comprising:
an engine mount; and
a hinge for each gull wing door, the hinge adjacent the engine mount and mounting the pair of gull wing doors to the nacelle;
wherein the pair of gull wing doors include a hinge edge, coupled to the corresponding hinge such that at least one of the inner barrel or the outer barrel of each gull wing door are independently movable with respect to one another.

17. The unducted fan turbine engine of claim 15, wherein the internal passage forms an annulus about the engine core, extending, in total, at least 240 degrees about the engine core.

18. An unducted fan turbine engine comprising:
an engine core having in serial, axial flow arrangement a compressor section, a combustor section, and a turbine section and defining a first airflow axially through the engine core;
a nacelle circumscribing at least a portion of the engine core and having an exterior surface defining a second airflow along the exterior surface and an internal passage extending between an inlet and an outlet and being located between the exterior surface and the engine core and defining a third airflow;
a plurality of rotatable fan blades extending radially beyond the exterior surface of the nacelle and rotationally driven by the engine core, the plurality of rotatable fan blades being provided forward of the inlet of the internal passage; and a cowl door located in the nacelle and movable between opened and closed positions to provide selective access to at least a portion of the engine core, wherein the cowl door has an interior forming at least a portion of the internal passage;

wherein cowl door meets the engine core at an engine split line provided rearwardly of the plurality of rotatable fan blades and the inlet of the internal passage.

19. The unducted fan turbine engine of claim 2, wherein the outer barrel is independently movable with respect to the inner barrel.

20. The unducted turbine fan engine of claim 2, wherein the inner barrel extends over a first circumferential distance about the engine core defined by a first angle and the outer barrel extends over a second circumferential distance about the engine core defined by a second angle equal to the first angle.

* * * * *

UNITED STATES PATENT AND TRADEMARK OFFICE
CERTIFICATE OF CORRECTION

PATENT NO. : 11,639,671 B2
APPLICATION NO. : 17/368214
DATED : May 2, 2023
INVENTOR(S) : John Carl Glessner and Mark Edward Linz It is certified that error appears in the above-identified patent and that said Letters Patent is hereby corrected as shown below:

In the Claims

Column 17, Claim 12, Line 58; "rotatatable" should be -- rotatable --.

Signed and Sealed this
Thirteenth Day of August, 2024

Katherine Kelly Vidal
*Director of the United States Patent and Trademark Office*